US011890874B2

(12) United States Patent
Liu

(10) Patent No.: US 11,890,874 B2
(45) Date of Patent: Feb. 6, 2024

(54) NOZZLE INK CARTRIDGE, CIRCUIT SUBSTRATE, AND NOZZLE INK CARTRIDGE ASSEMBLY

(71) Applicant: GEEHY MICROELECTRONICS INC., Zhuhai (CN)

(72) Inventor: Weichen Liu, Zhuhai (CN)

(73) Assignee: GEEHY MICROELECTRONICS INC., Zhuhai (CN)

( * ) Notice: Subject to any disclaimer, the term of this patent is extended or adjusted under 35 U.S.C. 154(b) by 229 days.

(21) Appl. No.: 17/600,248

(22) PCT Filed: Mar. 18, 2020

(86) PCT No.: PCT/CN2020/079986
§ 371 (c)(1),
(2) Date: Sep. 30, 2021

(87) PCT Pub. No.: WO2020/224336
PCT Pub. Date: Nov. 12, 2020

(65) Prior Publication Data

US 2022/0184964 A1 Jun. 16, 2022

Related U.S. Application Data

(63) Continuation of application No. PCT/CN2020/079986, filed on Mar. 18, 2020.

(30) Foreign Application Priority Data

May 6, 2019 (CN) ......................... 201910370854.1
Sep. 3, 2019 (CN) ......................... 201910828145.3

(51) Int. Cl.
*B41J 2/175* (2006.01)

(52) U.S. Cl.
CPC ....... *B41J 2/17526* (2013.01); *B41J 2/17523* (2013.01)

(58) Field of Classification Search
CPC .......................... B41J 2/17526; B41J 2/17523
See application file for complete search history.

(56) References Cited

U.S. PATENT DOCUMENTS 5,788,388 A 8/1998 Cowger et al.
6,000,773 A * 12/1999 Murray ............... B41J 2/17566 347/7

(Continued)

FOREIGN PATENT DOCUMENTS

CN 1618613 A 5/2005
CN 1654216 A 8/2005

(Continued)

OTHER PUBLICATIONS

The World Intellectual Property Organization (WIPO) International Search Report for PCT /CN2020/079986 dated Jun. 10, 2020 8 Pages (including translation).

*Primary Examiner* — Jason S Uhlenhake
(74) *Attorney, Agent, or Firm* — ANOVA LAW GROUP PLLC

(57) ABSTRACT

A nozzle ink cartridge includes an ink cartridge main body and a first circuit substrate disposed at the ink cartridge main body. The first circuit substrate is configured with, a nozzle circuit and a first interface circuit. A second circuit substrate is disposed on the ink cartridge main body, and configured with a second interface circuit and a third interface circuit, which are electrically connected and disposed on a same side of the ink cartridge main body. A replaceable ink container is contained in an accommodation portion and configured with a first storage circuit and a fourth interface circuit electrically connected to the first storage circuit and the third interface circuit. The first storage circuit at least (Continued)

stores ink amount information of the ink container. The second circuit substrate is further configured with a switching circuit capable of processing signal transmission between the second and third interface circuits.

18 Claims, 6 Drawing Sheets

(56) References Cited

U.S. PATENT DOCUMENTS

| | | | |
|---|---|---|---|
| 6,536,871 B1 | 3/2003 | Haddick et al. | |
| 8,708,470 B1 | 4/2014 | Blowfield et al. | |
| 9,517,632 B2 * | 12/2016 | Takagi | B41J 2/1752 |
| 2014/0225946 A1 | 8/2014 | Quinn et al. | |

FOREIGN PATENT DOCUMENTS

| | | | |
|---|---|---|---|
| CN | 201856448 | U | 6/2011 |
| CN | 104070824 | A | 10/2014 |
| CN | 204472118 | U | 7/2015 |
| CN | 206584163 | U | 10/2017 |
| CN | 109605941 | A | 4/2019 |
| CN | 110027324 | A | 7/2019 |
| CN | 110406265 | A | 11/2019 |
| EP | 1004447 | A2 | 5/2000 |
| EP | 2653316 | A1 | 10/2013 |
| JP | H08207391 | A | 8/1996 |
| JP | H08230206 | A | 9/1996 |
| JP | H11348308 | A | 12/1999 |
| JP | 2004358912 | A | 12/2004 |
| JP | 2009096065 | A | 5/2009 |
| JP | 2010167650 | A | 8/2010 |
| JP | 2014058075 | A | 4/2014 |
| WO | 2011115859 | A2 | 9/2011 |

* cited by examiner

NOZZLE INK CARTRIDGE, CIRCUIT SUBSTRATE, AND NOZZLE INK CARTRIDGE ASSEMBLY

CROSS-REFERENCE TO RELATED APPLICATION

This application is a continuation application of International Application No. PCT/CN2020/079986, filed on Mar. 18, 2020, which claims priority of Chinese Patent Application No. 201910370854.1, entitled "Nozzle Ink Cartridge, Inkjet Assembly, and Circuit Substrate," filed on May 6, 2019, in the China National Intellectual Property Administration; and No. 201910828145.3, entitled "Nozzle Ink Cartridge and Circuit Substrate," filed on Sep. 3, 2019, in the China National Intellectual Property Administration, the entire content of all of which is incorporated herein by reference.

TECHNICAL FIELD

The present disclosure generally relates to the field of image forming consumable technology and, more particularly, relates to a nozzle ink cartridge, a circuit substrate, and a nozzle ink cartridge assembly.

BACKGROUND

Image forming apparatuses (e.g., printers) have printing consumables, such as toner cartridges, ink cartridges and the like, for providing printing materials. In the existing technology, a nozzle ink cartridge may include an ink cartridge main body, an ink cartridge container and a nozzle circuit which are integrated into one piece, where the nozzle circuit may record ink amount information of the ink cartridge container. Once the ink in the ink cartridge container is used up, the ink amount information may be written as a used-up state. Even if a new full ink cartridge container is installed on the ink cartridge main body, the ink consumption request may not be recorded in real time, which may affect the printing quality. At this point, the nozzle circuit of the nozzle ink cartridge may still be intact. Therefore, under the premise of not damaging the original ink cartridge as possible, there is a need to provide a technology which may process the connection relationship and data processing logic between all chips in the ink cartridge, simplify the production process more optimally, recycle the nozzle circuit at a lower cost, and recycle and manufacture the nozzle ink cartridge more efficiently.

SUMMARY

In order to at least partially overcome the above-mentioned shortcomings in the existing technology, one of the objectives of the present disclosure is to provide a nozzle ink cartridge, a circuit substrate and a nozzle ink cartridge assembly.

In order to achieve the above-mentioned objective, the following technical solutions are used in embodiments of the present disclosure.

The first aspect of exemplary embodiments of the present disclosure provides a nozzle ink cartridge, including an ink cartridge main body and a first circuit substrate disposed on the ink cartridge main body, where the first circuit substrate is configured with a nozzle circuit and a first interface circuit that are electrically connected to each other. The nozzle ink cartridge further includes: a second circuit substrate disposed on the ink cartridge main body, where the second circuit substrate is configured with a second interface circuit and a third interface circuit; and the second interface circuit and the first interface circuit are disposed on a same side of the ink cartridge main body and are electrically connected to each other; and an accommodation portion and an ink container that is replaceable, where the ink container is contained in the accommodation portion, the ink container is configured with a first storage circuit and a fourth interface circuit that are electrically connected to each other, the fourth interface circuit is electrically connected to the third interface circuit, and the first storage circuit at least stores ink amount information of the ink container; the second circuit substrate is further configured with a switching circuit; and the switching circuit is configured to be capable of processing signal transmission between the second interface circuit and the third interface circuit.

The second aspect of exemplary embodiments of the present disclosure provides a circuit substrate, configured with a second interface circuit, a third interface circuit, and a switching circuit provided by the first aspect of embodiments of the present disclosure; and the switching circuit is configured to be capable of processing signal transmission between the second interface circuit and the third interface circuit.

The third aspect of exemplary embodiments of the present disclosure provides a nozzle ink cartridge assembly, including an ink cartridge main body and a first circuit substrate disposed on the ink cartridge main body, where the first circuit substrate is configured with a nozzle circuit and a first interface circuit that are electrically connected to each other. The nozzle ink cartridge assembly further includes: a second circuit substrate disposed on the ink cartridge main body, wherein the second circuit substrate is configured with a second interface circuit and a third interface circuit; and the second interface circuit and the first interface circuit are disposed on a same side of the ink cartridge main body and are electrically connected to each other; an accommodation portion capable of accommodating an ink container that is replaceable, where the second circuit substrate is further configured with a switching circuit, and the switching circuit is configured to be capable of processing signal transmission between the second interface circuit and the third interface circuit.

Compared with the existing technology, exemplary embodiments of the present disclosure provide the nozzle ink cartridge, the circuit substrate, and the nozzle ink cartridge assembly, where the nozzle ink cartridge may include the ink cartridge main body and the first circuit substrate disposed on the ink cartridge main body; the first circuit substrate may be configured with the nozzle circuit and the first interface circuit that are connected to each other; the nozzle ink cartridge may further include the second circuit substrate disposed on the ink cartridge main body, the accommodation portion, and the ink container that is replaceable; the second circuit substrate may be configured with the second interface circuit and the third interface circuit; the second interface circuit and the first interface circuit may be disposed on the same side of the ink cartridge main body and may be electrically connected to each other; the ink container may be contained in the accommodation portion; the ink container may be configured with the first storage circuit and the fourth interface circuit which are electrically connected to each other; the fourth interface circuit may be electrically connected to the third interface circuit; the first storage circuit may at least store the ink amount information of the ink container; the second circuit substrate may be further configured with the switching circuit; and the switching circuit may be configured to be capable of processing signal transmission between the second interface circuit and the third interface circuit. Through the above-mentioned design, the ink container of the nozzle ink cartridge may be replaced more conveniently; in addition, since the information between various chips of the ink cartridge can be transmitted smoothly, normal information exchange of the ink cartridge may be ensured, and after the ink container of the nozzle ink cartridge is replaced, the ink amount information read by the printer from the nozzle cartridge may indicate the ink amount of the ink container after replacement.

BRIEF DESCRIPTION OF THE DRAWINGS

In order to clearly illustrate the technical solutions in exemplary embodiments of the present disclosure, the drawings required to be used in exemplary embodiments are briefly described hereinafter. It should be understood that the following drawings may merely illustrate some exemplary embodiments of the present disclosure; therefore the following drawings may not to be considered as the scope limitation. Other related drawings may be obtained according to such drawings by those skilled in the art without creative work.

DETAILED DESCRIPTION

Figure 1:
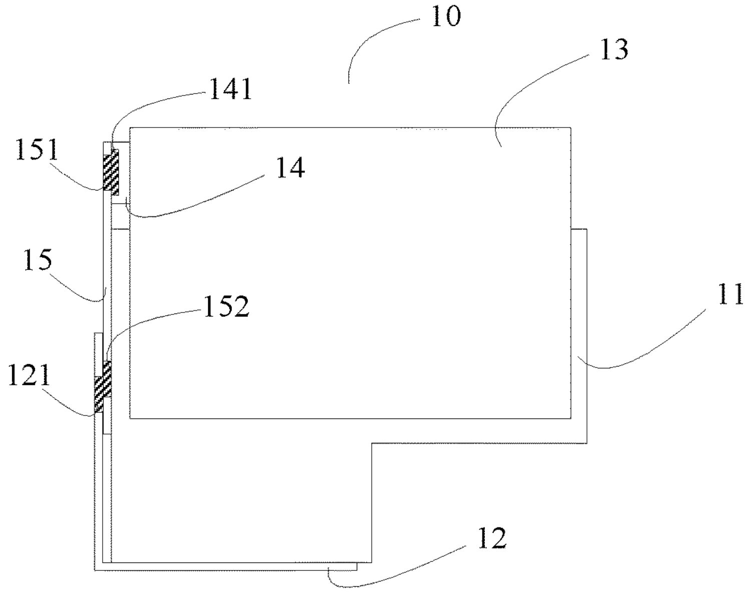
FIG. 1 illustrates a structural schematic of a nozzle ink cartridge provided by exemplary embodiments of the present disclosure.

In order to illustrate objectives, technical solutions and advantages of exemplary embodiments of the present disclosure more clearly, the technical solutions in exemplary embodiments of the present disclosure may be clearly and completely described with reference to the drawings in exemplary embodiments of the present disclosure hereinafter. Obviously, described exemplary embodiments may be a part of exemplary embodiments of the present disclosure, rather than all of exemplary embodiments of the present disclosure. The components of exemplary embodiments of the present disclosure described and shown in the drawings herein may be arranged and designed in various different configurations.

Therefore, the following detailed description of exemplary embodiments of the present disclosure provided in the drawings may not be intended to limit the protection scope of the present disclosure, but may merely represent selected exemplary embodiments of the present disclosure. Based on exemplary embodiments in the present disclosure, all other exemplary embodiments obtained by those skilled in the art without creative work shall fall within the protection scope of the present disclosure.

It should be noted that similar reference numerals and letters may indicate similar items in the following drawings. Therefore, once a certain item is defined in one drawing, it may not need to be further defined and explained in the subsequent drawings.

Figure 2:
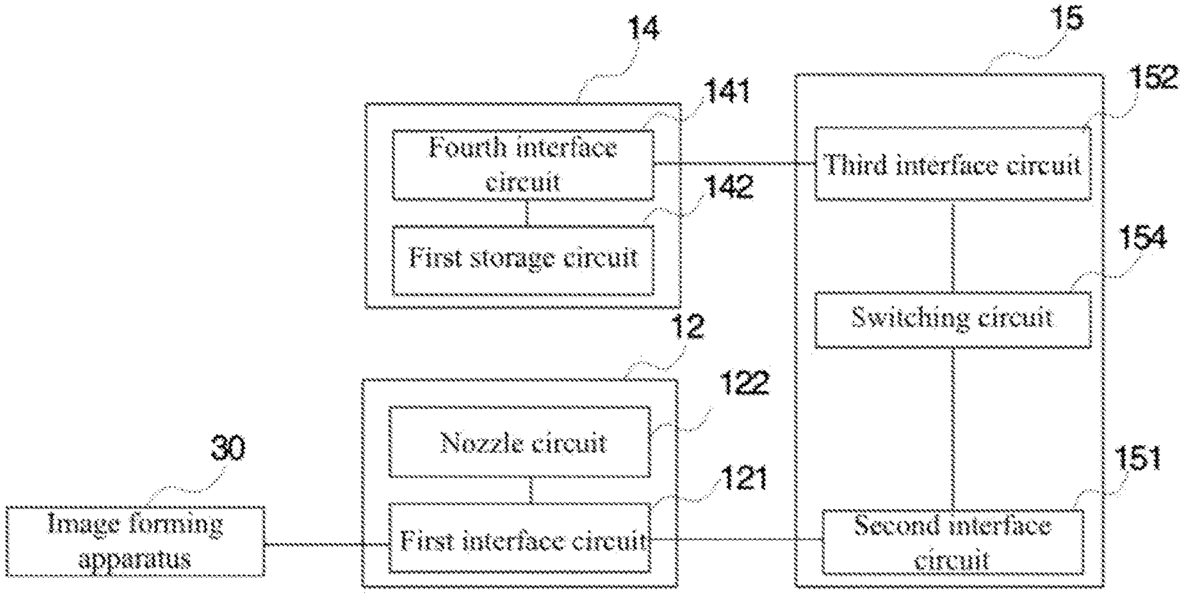
FIG. 2 illustrates a schematic of an electrical connection relationship of a nozzle ink cartridge provided by exemplary embodiments of the present disclosure.

FIG. 1 illustrates a structural schematic of a nozzle ink cartridge provided by exemplary embodiments of the present disclosure. FIG. 2 illustrates a schematic of an electrical connection relationship of a nozzle ink cartridge provided by exemplary embodiments of the present disclosure. Referring to FIGS. 1-2, a nozzle ink cartridge 10 may include an ink cartridge main body 11, a first circuit substrate 12, an ink container 13, and a second circuit substrate 15, where the first circuit substrate 12 may be attached to the ink cartridge main body 11, and the first circuit substrate 12 may be configured with a first interface circuit 121 and a nozzle circuit 122 which are electrically connected to each other. The second circuit substrate 15 may be attached to the ink cartridge main body 11, and the second circuit substrate 15 may be configured with a second interface circuit 151, a third interface circuit 152, and a switching circuit 154, where the second interface circuit 151 and the first interface circuit 121 may be disposed at a same side of the ink cartridge main body 11, the second interface circuit 151 and the first interface circuit 121 may be electrically connected to each other, and the switching circuit 154 may process the signal transmission between the second interface circuit 151 and the third interface circuit 152. The ink cartridge main body 11 may have an accommodation portion, and the ink container 13 may be detachably or replaceably installed on the accommodation portion.

Referring to FIG. 2, when the nozzle ink cartridge 10 is installed on an image forming apparatus 30, the first interface circuit 121 may be electrically connected to the probe of the image forming apparatus 30 to establish electrical communication with the image forming apparatus 30. In such case, the first interface circuit 121 may receive control signals, read commands, write commands and the like which are transmitted from the image forming apparatus 30. The interface circuit may normally include a plurality of electrical interfaces (or electrical connection terminals). The electrical interface may be a conductive contact, such as a metal contact; and specifically, the electrical interface may be a contact made of a metal such as copper.

Furthermore, in order to prevent the surface of the metal contact from being oxidized, a gold deposition operation may be performed on the surface of the metal contact. The interface circuit described in exemplary embodiments of the present disclosure may refer to an interface circuit configured to establish electrical communication with a printer during the operating process of installing the nozzle ink cartridge 10 in the printer. Optionally, the plurality of electrical interfaces may include a plurality of types; for example, the plurality of electrical interfaces may be classified according to the types of their transmission signals.

Referring to FIGS. 1-2, the nozzle circuit 122, electrically connected to the first interface circuit 121, may be communicatively connected to the image forming apparatus 30 through the first interface circuit 121. Specifically, the nozzle circuit 122 may receive an inkjet control signal transmitted from the image forming apparatus 30 through the first interface circuit 121, and then control the ink in the ink container 13 to jet regularly, thereby forming an image on the corresponding image forming medium. It should be noted that the ink cartridge main body 11 may have an ink channel which is connected with the nozzle circuit 122, and the ink container 13 may be configured with an ink outlet which is connected with the ink channel. When the ink container 13 is installed on the ink cartridge main body 11, the ink in the ink container 13 may enter the ink channel of the ink cartridge main body 11 through the ink outlet, and then flow to the nozzle circuit 122.

In one exemplary embodiment, referring to FIG. 2, the replaceable ink container 13 may be configured with a first storage circuit 142 and a fourth interface circuit 141 which are electrically connected to each other. The first storage circuit 142 may at least store the ink amount information of the ink container 13, and the ink amount information may be normally used to indicate the ink state in the ink container 13, for example, the ink consumption level and the like. Obviously, the first storage circuit 142 may also store other information related to the ink container 13 which may change with the replacement of the ink container. The fourth interface circuit 141 and the first storage circuit 142 may be disposed on a same circuit substrate, for example, a third circuit substrate 14.

Referring to FIG. 2, it should be noted that the interfaces of the third interface circuit 152 and the fourth interface circuit 141 may be welded together, or may be connected by pasting or other detachable manners.

Referring to FIG. 2, the switching circuit 154 on the second circuit substrate 15 may be electrically connected to the first interface circuit 121. For example, the second circuit substrate 15 may be electrically connected to the first interface circuit 121 through the second interface circuit 151. In some exemplary embodiments, the second interface circuit 151 may be disposed on a position of the second circuit substrate 15 which covers the first interface circuit 121, and may be directly electrically connected to the first interface circuit 121.

On the other hand, referring to FIG. 2, in order to enable the printer to access the ink state information in the first storage circuit 142, the fourth interface circuit 141 may be electrically connected to the third interface circuit 152; and when the replaceable ink container 13 is installed on the ink cartridge main body 11, the first storage circuit 142 may establish an electrical connection with the switching circuit 154 through the third interface circuit 152. In such way, the image forming apparatus 30 may access the first storage circuit 142 through the switching circuit 154 and perform read operations or write operations on the ink amount information in the first storage circuit 142.

Referring to FIG. 2, the switching circuit 154 may be configured to process the signal transmission between the second interface circuit 151 and the third interface circuit 152. For example, the switching circuit 154 may be configured to receive all signals transmitted from the second interface circuit 151, and process a part or all of the signals to the third interface circuit 152 and then transmit the part or all of the signals to the first storage circuit 142 as needed. For example, the switching circuit 154 may process a signal received from the second interface circuit 151 into a signal suitable for the first storage circuit. For example, the switching circuit 154 may process a signal received from the second interface circuit 151 into a signal corresponding to the interface type of the fourth interface circuit.

Figure 3:
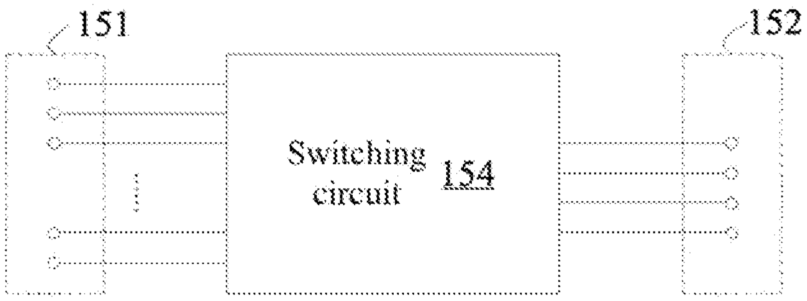
FIG. 3 illustrates a schematic of an electrical connection relationship of a second circuit substrate of a nozzle ink cartridge provided by exemplary embodiments of the present disclosure.

In exemplary embodiments of the present disclosure, the quantity of the interfaces of the third interface circuit 152 may be less than the quantity of the interfaces of the first interface circuit 121, as shown in FIG. 3. As described above, the first interface circuit 121 may transmit the inkjet control signal sent to the nozzle circuit 122. The inkjet control signal may include a heating signal, which may act on a heating resistor specified in the nozzle circuit 122, such that the liquid around the heating resistor may be heated and expanded to be pushed from corresponding nozzle holes to form an image. The inkjet control signal may also include an address selection signal, a clock signal, a resistor detection signal and the like, which are configured to control inkjet. The address selection signal may correspond to the address of the specified heating resistor in the nozzle circuit 122, and the printer may select the specified heating resistor by inputting the address selection signal to the nozzle circuit 122; the resistor detection signal may also be a detection signal for the above-mentioned heating resistor or other specific resistors, and the printer may detect the inkjet performance or identification of the nozzle circuit by inputting the resistor detection signal to the nozzle circuit 122. Correspondingly, the first interface circuit 121 may include a heating signal interface, which may be capable of receiving the heating signal transmitted to the nozzle circuit 122. Exemplarily, the first interface circuit 121 may further include an address selection signal interface, a clock signal interface, a resistor detection signal interface, and the like.

In exemplary embodiments of the present disclosure, data access signals of the first storage circuit 142 may include a clock signal, an address access signal, and a data access signal. The address access signal may correspond to a plurality of data addresses of the storage circuit, and the printer may select a specified data address by inputting the address access signal to the first storage circuit 142, thereby implementing data access; and the data access signal may be a read signal or a write signal for the first storage circuit 142, and the printer may acquire or rewrite the data on the specified data address by inputting the data access signal to the first storage circuit 142. Correspondingly, the fourth interface circuit 141 may include a clock interface, an address access interface, and a data interface. Through these interfaces, the image forming apparatus 30 may access the first storage circuit 142. The third interface circuit 152 may have less interfaces than the first interface circuit 121. For example, the first interface circuit 121 may have one or more interfaces, that the third interface circuit 152 does not have, including, for example, a heating signal interface or a resistor detection signal interface.

In some exemplary embodiments of the present disclosure, the above-mentioned address selection signal interface, clock signal interface and other interfaces configured to transmit the inkjet control signal may also be configured to transmit the data access signal for accessing the storage circuit. For example, the clock signal may be a clock control signal shared by the storage circuit and the nozzle circuit 122. For example, the address selection signal may be additionally converted into the data address access signal of the storage circuit. In such way, a part of the interfaces of the first interface circuit 121 may be configured as shared signal interfaces between the nozzle circuit 122 and the storage circuit.

Specifically, the first interface circuit 121 may be disposed with a plurality of interfaces for transmitting an inkjet control signal and a plurality of interfaces for transmitting the data access signal, where these interfaces may be partially shared with each other. The second interface circuit 151 on the second circuit substrate 15 may be disposed on the same side of the ink cartridge main body, and the second interface circuit 151 may be electrically connected to the first interface circuit 121. The image forming apparatus 30 may be in direct contact with the first interface circuit 121 and transmit the data access signal to the second interface circuit 151 through a plurality of data access interfaces, and transmit the inkjet control signal to the nozzle circuit 122 through a plurality of nozzle control interfaces. At this point, the second interface circuit 151 may be disposed with a plurality of interfaces, the quantity of the plurality of interfaces may at least correspond to the quantity of data access interfaces in the first interface circuit 121, and may be electrically connected to the first interface circuit 121.

It should be noted that the plurality of interfaces of the first interface circuit 121 may be configured as through electrical interfaces (through terminals). For example, the front side (the side facing away from the ink cartridge main body 11) and the back side (the side facing toward the ink cartridge main body 11) of the plurality of interfaces of the first interface circuit 121 may be configured to expose electrical contacts. In one exemplary embodiment, in an implementation manner where the second interface circuit 151 on the second circuit substrate 15 is electrically connected to the first interface circuit 121, the second interface circuit 151 may be in contact with the back of the interfaces connected to the first interface circuit 121.

In some exemplary embodiments, the third interface circuit 152 may be configured to have a same quantity of the interfaces as the second interface circuit 151. The switching circuit 154 may process all signals transmitted from the second interface circuit 151, and transmit the signals on all interfaces of the second interface circuit 151 to corresponding interfaces of the third interface circuit 152. For example, the switching circuit 154 may process the data access signal received from the second interface circuit 151 into an access signal suitable for the first storage circuit 142. For example, the third interface circuit 152 may be electrically connected to the fourth interface circuit 141, and the switching circuit 154 may transmit all received data access signals to the interfaces corresponding to the interface signal type of the fourth interface circuit 141 through the third interface circuit 152. For example, the switching circuit 154 may only receive the data access signals, and convert these data access signals into applicable signals which are compatible with the communication protocol of the first storage circuit 142; for example, other type protocol signals may be converted into I2C protocol signals suitable for the first storage circuit 142. For another example, the signal received by the switching circuit 154 may be in a certain encrypted form and cannot be directly received and identified by the first storage circuit 142; at this point, the switching circuit 154 may perform decryption processing on the received signal and output a data access signal suitable for the first storage circuit 142.

In the above-mentioned exemplary embodiments where a part of the signal interfaces is shared, the switching circuit 154 may receive the address selection signal transmitted to the nozzle circuit 122 and process the address selection signal into the data address access signal suitable for the first storage circuit 142 which is then transmitted to the first storage circuit 142 through the third interface circuit 152. Obviously, the above-mentioned signal processing may not be limited to the address selection signal.

Those skilled in the art should understand that when the switching circuit 154 processes the signal transmission between the second interface circuit and the third interface circuit, it may specifically include signal reception, transmission, and corresponding processing of various signals (including but not limited to operation processes, such as the conversion between different signals, signal merging, signal separation, and the like), where its specific process and steps may be signal transmission operation manners well known to those skilled in the art which may not be limited herein.

The region where the second interface circuit 151 is located may at least partially overlap the region where the first interface circuit 121 is located, such that at least a part of the electrical connection terminals of the second interface circuit 151 may be connected to corresponding electrical connection terminals of the first interface circuit 121. The plurality of interfaces of the second interface circuit 151 may be disposed as that the arrangement positions correspond to the positions of the data access interfaces in the first interface circuit 121, which may be convenient for the electrical connection establishment of corresponding interfaces through the manners of welding, clamping, pasting, or the like.

In the above-mentioned exemplary embodiments, the second circuit substrate 15 may be normally disposed on the inner side of the first circuit substrate 12 (the side closer to the ink cartridge main body 11), as shown in FIG. 1.

Figure 4:
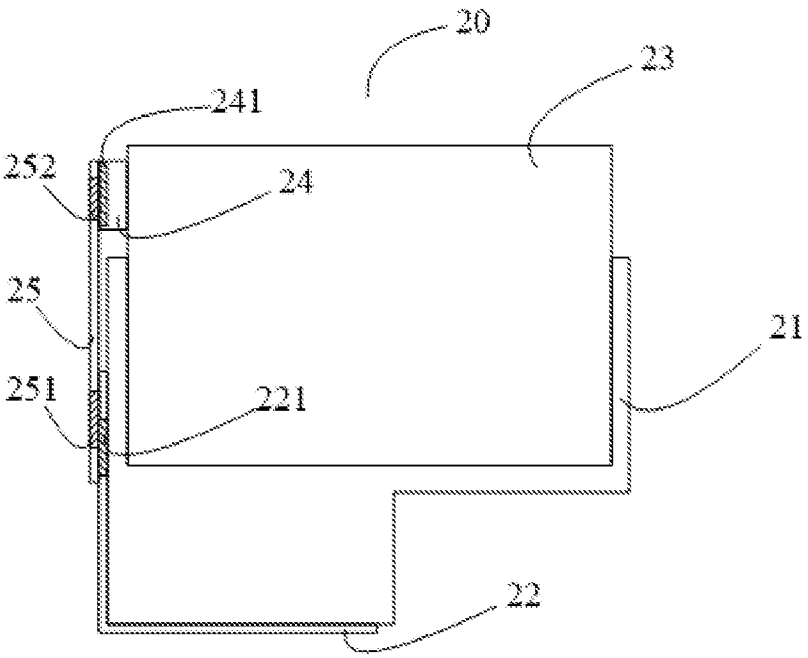
FIG. 4 illustrates another structural schematic of a nozzle ink cartridge provided by exemplary embodiments of the present disclosure.
Figure 5:
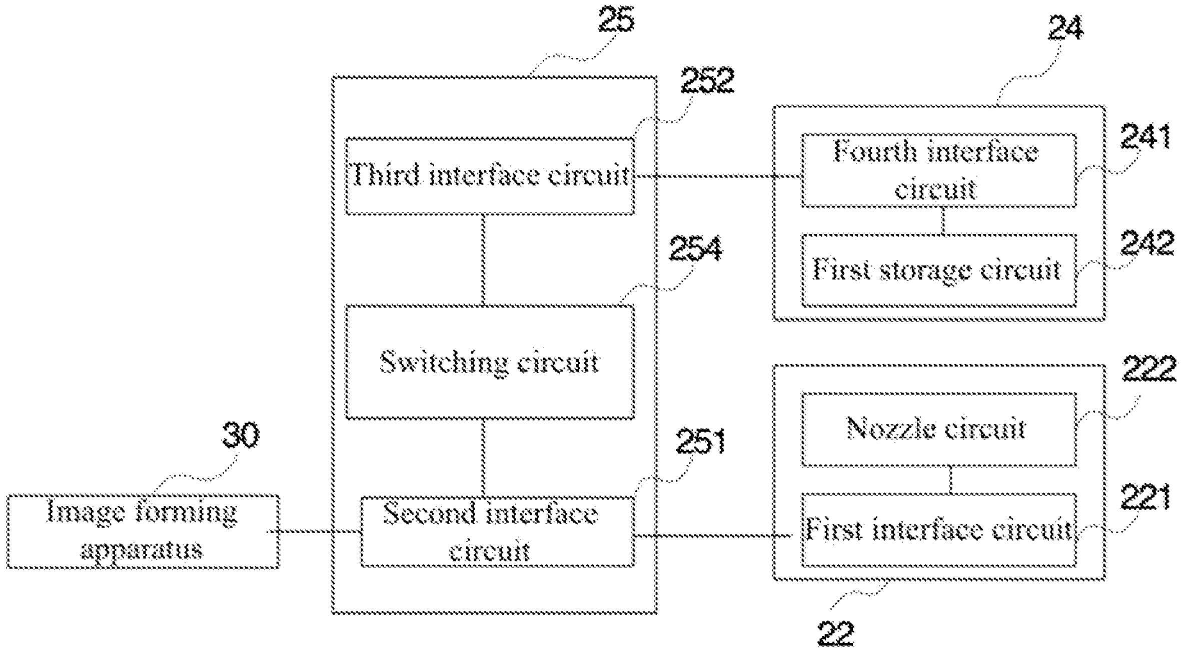
FIG. 5 illustrates a schematic of another electrical connection relationship of a nozzle ink cartridge provided by exemplary embodiments of the present disclosure.

In other exemplary embodiments, as shown in FIGS. 4-5, the second circuit substrate 25 may also be disposed on the outer side of the first circuit substrate 22 (the side away from the ink cartridge main body 21). For example, the plurality of interfaces in the second interface circuit 251 may be disposed as through electrical terminals, the image forming apparatus 30 may in contact with the first interface circuit 221 by contacting the front surface of the interfaces of the second interface circuit 251 and contacting the first interface circuit 221 through the back surface of the interfaces of the second interface circuit 251.

Figure 6:
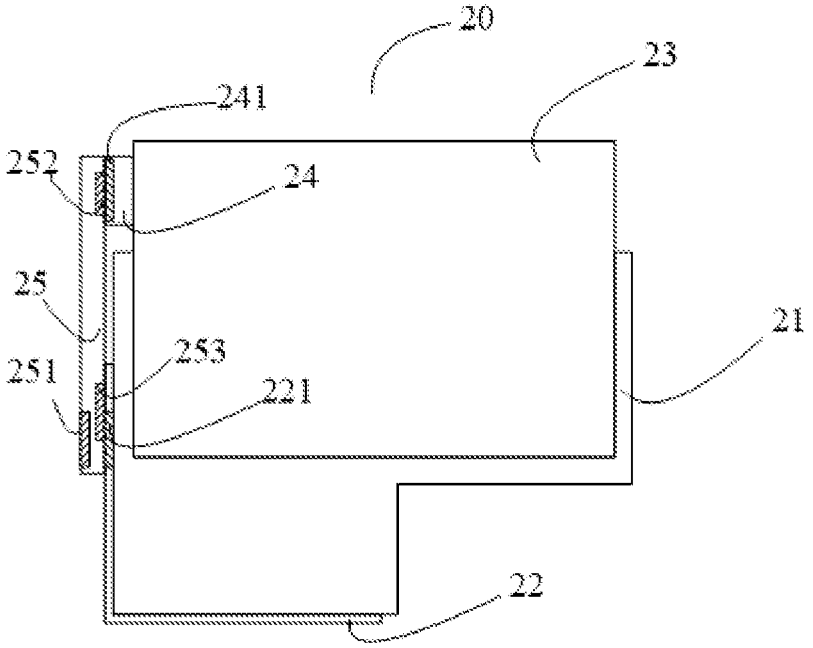
FIG. 6 illustrates another structural schematic of a nozzle ink cartridge provided by exemplary embodiments of the present disclosure.

In other exemplary embodiments where the second circuit substrate is disposed on the outer side of the first circuit substrate, the second circuit substrate 25 may also be configured with a fifth interface circuit. The fifth interface circuit may be configured to be electrically connected to the first interface circuit, and may be electrically connected to the second interface circuit through the switching circuit, as shown in FIGS. 6 and 7.

Figure 7:
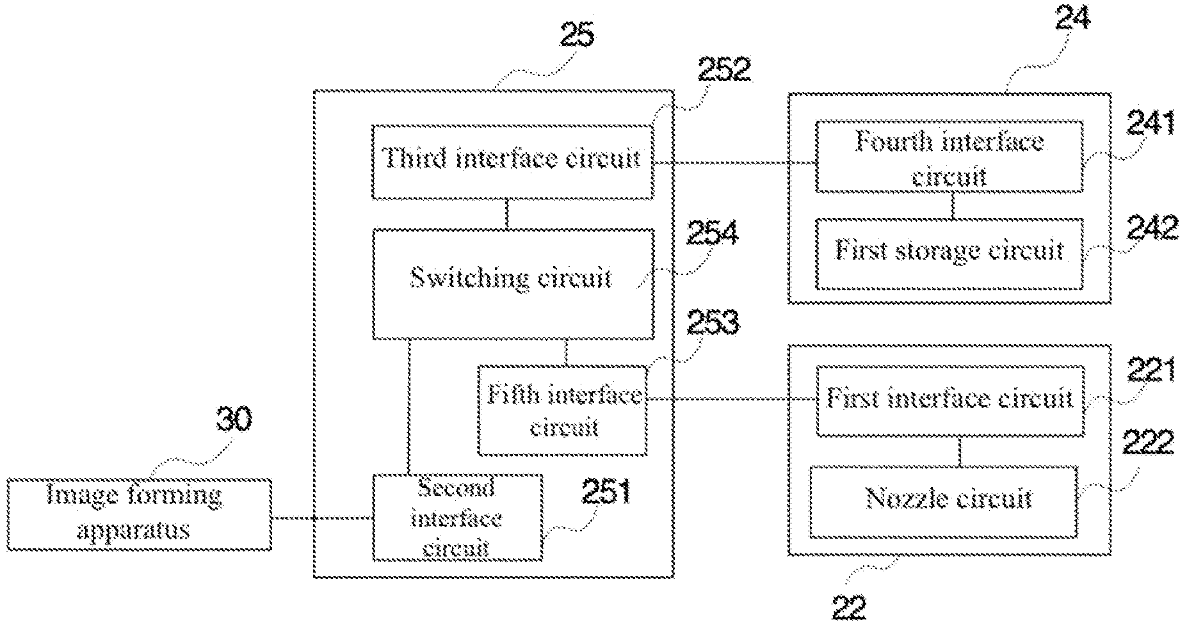
FIG. 7 illustrates a schematic of another electrical connection relationship of a nozzle ink cartridge provided by exemplary embodiments of the present disclosure.

Exemplarily, as shown in FIG. 7, a second interface circuit 251 may be configured to be that the quantity of the interfaces of the second interface circuit 251 is equal to the quantity of the interfaces of a first interface circuit 221, and may be electrically connected to the image forming apparatus 30. For example, the plurality of interfaces of the second interface circuit 251 may be configured at positions corresponding to positions of the plurality of interfaces of the first interface circuit 221, such that the probe of the image forming apparatus 30 may be in contact with the plurality of interfaces of the second interface circuit 251.

At this point, the plurality of interfaces of the second interface circuit 251 may include the plurality of interfaces corresponding to the inkjet control signal interface and the data access signal interface. A switching circuit 254 may process all signals transmitted from the second interface circuit 251, and transmit the signals on a part of the interfaces of the second interface circuit 251 to corresponding interfaces of a third interface circuit 252, that is, extraction processing may be performed on the received signals. Specifically, the switching circuit 254 may process the signal on the data access signal interface on the second circuit interface 251 to the corresponding interface of the third interface circuit 252. The above-mentioned processing may also include at least one processing manner such as signal decryption processing, communication protocol conversion, signal identification, interface matching and the like.

Exemplarily, the quantity of the interfaces of the fifth interface circuit 253 may be less than the quantity of the interfaces of the first interface circuit 221. Specifically, the fifth interface circuit 253 may be configured to have only an inkjet control signal interface, which is sufficient to transmit the inkjet control signal to the nozzle circuit. For example, the interfaces of the fifth interface circuit 253 may be less than the interfaces of the first interface circuit 221 by a data signal interface.

Exemplarily, the fifth interface circuit 253 may also be configured to be that the quantity of the interfaces of the fifth interface circuit 253 is consistent with the quantity of the interfaces of the second interface circuit 251, and the first interface circuit 221 may be configured to be that the electrical connection between a part of the interfaces of the first interface circuit 221 and a nozzle circuit 222 may be disconnected. For example, the data access signal interface of the first interface circuit 221 may be disconnected. The above-mentioned design may enable the nozzle circuit 222 to receive only the inkjet control signal but not the data access signal, which may avoid data pollution to a certain extent.

In some exemplary embodiments of the present disclosure, the second circuit substrate 15/25 may be further configured with a second storage circuit (not labeled in figures), where the second storage circuit may store at least a part of the ink cartridge data. The ink cartridge data may indicate the basic information of the nozzle ink cartridge 10/20, and may include data such as the production date, nozzle type, model, color, encryption manner, hardware parameter information and the like of the nozzle ink cartridge 10/20. The switching circuit 154/254 may process all signals transmitted from the second interface circuit 151/251, and transmit a part or all of the signals to the second storage circuit. Specifically, the switching circuit 154/254 may process and transmit the data access signal to the second storage circuit, thereby implementing the data access of the second storage circuit by the image forming apparatus 30.

Through the above-mentioned design, the image forming apparatus 30 may access the data stored in the first storage circuit 142/242 and/or the second storage circuit. The signals transmitted by the switching circuit 154/254 to the second storage circuit may be consistent with the signals transmitted to the third interface circuit 152/252 (and the fourth interface circuit). Exemplarily, these signals may include a clock signal, an address signal, and a data signal.

Inventors have been found that in the existing technology, when the ink amount information read from the nozzle ink cartridge by the image forming apparatus indicates that the ink is used up, although the user is prompted to replace the ink container, the user may still be allowed to perform printing operations. In other words, when the ink in the ink container is used up and the heating resistor in the nozzle circuit is not surrounded by the ink, the image forming apparatus 30 may continue to control the heating resistor in the nozzle circuit 122/222 to generate heat according to user operations, which may easily cause damage to the nozzle circuit 122/222. In order to at least partially reduce the above-mentioned problems, in some other exemplary embodiments, the switching circuit 154/254 may further include a control circuit. The control circuit may be configured to be capable of controlling and switching the electrical connection between the third interface circuit 152/252 and the second interface circuit 151/251, thereby implementing the switch of the first storage circuit 142/242. For example, when there is an abnormality in the data of the first storage circuit 142/242, the first storage circuit 142/242 may be controlled to be disconnected.

In addition, when the ink amount information stored in the first storage circuit 142/242 is preset data, the control circuit may also be configured to interfere the communication between the first storage circuit 142/242 and the image forming apparatus 30, for example, configured to disconnect the connection between the first storage circuit 142/242 and the image forming apparatus 30, and for another example, configured to make the data transmission between the first storage circuit 142/242 and the image apparatus 30 abnormal. The preset data may be identification data, which is preset to indicate that the ink is used up, by the image forming apparatus 30 and the nozzle ink cartridge or the ink container. In one exemplary embodiment, the control circuit may be configured to control the first storage circuit 142/242 to be disconnected from the image forming apparatus 30 when the ink amount information stored in the first storage circuit 142/242 reaches the preset data. For example, when the ink amount data is written as an used-up state, the first storage circuit 142/242 may be disconnected to prevent the data from being mistakenly re-changed.

In such way, when the ink in the ink container 13 currently installed on the nozzle ink cartridge 10 is used up, the image forming apparatus 30 may be forced to stop printing, thereby prompting the user to replace the ink container.

Correspondingly, when the switching circuit 154/254 includes the second storage circuit, the control circuit may also be configured to interfere the communication between the second storage circuit and the image forming apparatus 30 when the data stored in the first storage circuit 142/242 is the preset data.

Exemplarily, the switching circuit 154/254 may include a signal processing unit, which processes the signals transmitted from the second interface circuit 151/251, and transmits a part or all of the signals to the third interface circuit 152/252 and/or the fifth interface circuit 253. As shown in FIG. 3, the switching circuit 154/254 may process the received signal into a signal suitable for the first storage circuit 142/242, and/or the second storage circuit, and/or the nozzle circuit 122/222. The signal processing unit may also have a plurality of wires to transmit the received signal to a corresponding type of signal interface.

In another implementation manner of one exemplary embodiment, the nozzle circuit 122/222 may record the ink amount information of the original ink container. The original ink container may refer to an ink container installed on the nozzle ink cartridge 10/20 before the ink container is replaced for the first time. Since the nozzle ink cartridge 10/20 is used up for the first time, the ink amount information stored in the nozzle circuit 122/222 may be written as an unchangeable used-up state. In such case, the first storage circuit 142/242 may be configured to repair the ink amount information in the nozzle circuit 122/222. Specifically, the first storage circuit 142/242 may store an ink amount repair value for the ink amount data in the used-up state in the nozzle circuit 122/222. It should be noted that the ink amount repair value in one exemplary embodiment may also be a type of the ink amount information.

In an implementation process, after replacing the ink container of the nozzle ink cartridge 10/20, if the control signal of the image forming apparatus 30 is received, the nozzle ink cartridge 10/20 may in parallel read the ink amount information separately stored in the first storage circuit 142/242 and the nozzle circuit 122/222, and the ink amount information finally transmitted to the image forming apparatus 30 may be the result of the superposition of two batches of the ink amount information.

In addition, it should be noted that the circuit substrate may also include other electrical terminals that are different from the above-mentioned interface circuits, for example, a plurality of interfaces for programming data or detecting chip performance. These interfaces, which do not communicate with the printer, may not be within the interface range of the interface circuit described in exemplary embodiments of the present disclosure.

Figure 8:
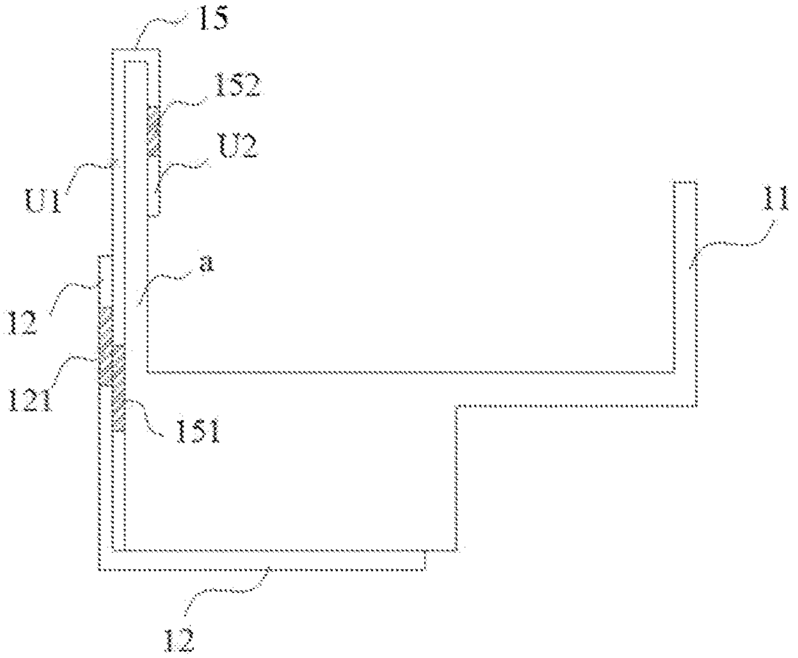
FIG. 8 illustrates a fourth structural schematic of a nozzle ink cartridge provided by exemplary embodiments of the present disclosure.

Specifically, referring to FIG. 8, the electrical connection terminals of the second interface circuit 151 and the electrical connection terminals of the third interface circuit 152 may be respectively disposed in different regions of the second circuit substrate 15. For example, the respective electrical connection terminals of the second interface circuit 151 and the third interface circuit 152 may be respectively disposed at two ends of the second circuit substrate 15.

Figure 9:
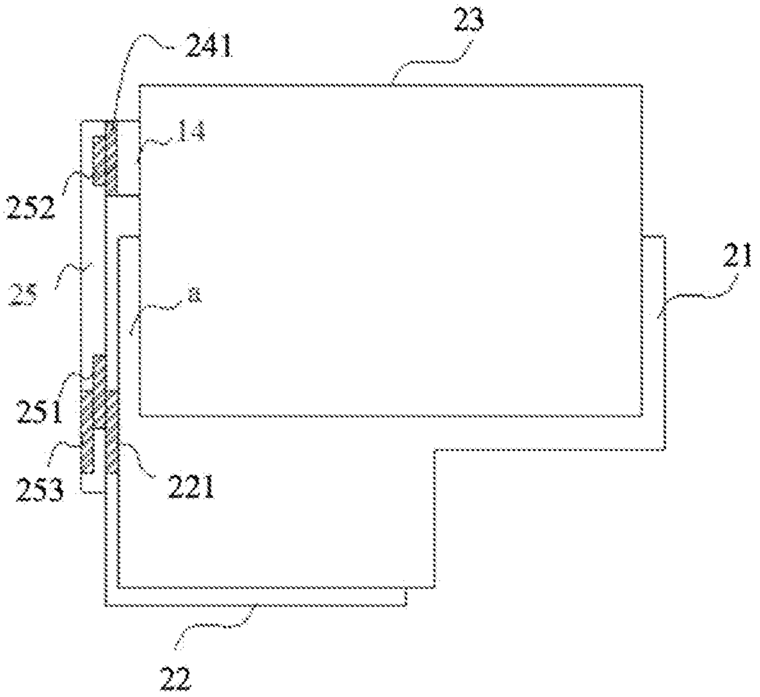
FIG. 9 illustrates a fifth structural schematic of a nozzle ink cartridge provided by exemplary embodiments of the present disclosure.

Exemplarily, referring to FIG. 9, the interfaces of the third interface circuit 152/252 and the fourth interface circuit 141/241 may be disposed to be in close contact with each other. For example, the interface may be configured as an electrical contact region with a certain area, and may be attached by a welding or pasting manner. Exemplarily, the interface of the third interface circuit 152/252 may also be a convex contact point or a retractable contact pin provided on the surface of the second circuit substrate 15/25, and the contact pin may expand and contract under the action of an external force. The protruded contact point or retractable contact pin may be configured to match a flat or recessed contact point on the fourth interface circuit 141/241, such that the connection of the electrical connection terminals of the third interface circuit 152/252 and the fourth interface circuit 141/241 may be more stable and easier to be detached.

Specifically, the protruded contact point may be obtained in the following manners.

Firstly, the thickness of a conductive contact point may be increased by placing solder or other metal materials on an existing conductive contact point, thereby forming the protruded contact point; secondly, the position of the conductive contact point (electrical connection terminal) of the third interface circuit 152/252 on the second circuit substrate 15/25 may be raised to form the protruded contact point; thirdly, when the interface is disposed on a soft board, the protrusion may be pressed out on the back of the contact region.

It should be noted that the height of the protruded contact point needs to be controlled within a certain range to reduce processing difficulty and ensure quality stability.

In one exemplary embodiment, the locations for the above-mentioned plurality of interface circuits may be multiple.

In an implementation manner, still referring to FIG. 1, the second interface circuit 151 may be disposed between the first interface circuit 121 and the side wall of the accommodation portion (i.e., the inner side of the first interface circuit 121). Specifically, the electrical connection terminals of the first interface circuit 121 may be disposed on the side of the first circuit substrate 12 facing toward the accommodation portion, the second circuit substrate 15 may be disposed on the side of the first circuit substrate 12 facing toward the accommodation portion, and the electrical connection terminals of the second interface circuit 151 may be disposed on the side of the second circuit substrate 15 facing toward the first circuit substrate 12, such that at least a part of the electrical connection terminals of the second interface circuit 151 may be connected to corresponding electrical connection terminals of the first interface circuit 121.

In one exemplary embodiment, the second circuit substrate 15 may have multiple structures. In one case, the second circuit substrate 15 may have a straight plate shape as shown in FIG. 1. When the ink container is contained in the accommodation portion, the ink container may be higher than the accommodation portion, and the part higher than the accommodation portion may be exposed; and the fourth interface circuit may be disposed on the exposed side wall of the ink container which is higher than the accommodation portion. At this point, since the ink container has a partial part exposed at the outer side of the accommodation portion, the fourth interface circuit 141 for connecting with other circuits may be conveniently disposed on the exposed side wall of the ink container, and a notch or opening hole may not need to be formed on the accommodation portion to connect the fourth interface circuit 141 with other circuits, which may have less impact on the structure of the accommodation portion. The accommodation portion may be disposed at a region where the third interface circuit 152 is disposed on the second circuit substrate 15, and the region may be configured with a position which can correspond to the fourth interface circuit 141 on the ink container 13. Therefore, when the ink container 13 is installed on the accommodation portion, the third interface circuit 152 may be exactly connected to the fourth interface circuit 141.

In another case, as shown in FIG. 8, the second circuit substrate 15 may be a flexible substrate. Therefore, the second circuit substrate 15 may be configured to be bent along a specific side wall a of the accommodation portion, and the specific side wall a may refer to the side wall disposed with the first circuit substrate 12 (or the first interface circuit 121). Specifically, the second circuit substrate 15 may be bent into a U-shaped structure, and the U-shaped structure may include a bottom and two side portions U1 and U2 respectively connected to two opposite sides of the bottom, where the side portion U1 may be in contact with the side of the specific side wall a facing toward the outer side of the accommodation portion, and the side portion U2 may be in contact with the side of the specific side wall a facing toward the inside of the accommodation portion. Two ends of a U-shaped structure may be respectively located on the side portion U1 and the side portion U2, such that the side portion U1 is located in a U1 region, and the side portion U2 is located in a U2 region. At this point, the U-shaped structure may use its own shape to cross the specific side wall a of the accommodation portion, such that the interface circuits on different sides of the specific side wall a may be connected, and forming through holes or openings on the specific side wall a may not be needed. The third interface circuit 152 may be disposed on the side of the side U2 facing toward the outer side of the U-shaped structure (i.e., the side facing away from the specific side wall a). A plurality of wires may be disposed in the bottom region of the U-shaped structure to connect the second interface circuit 151 and a part of the third interface circuit 152.

It should be noted that although two ends of the U-shaped structure are located in the U1 region and the U2 region respectively, the U1 region may include the entire side of the U-shaped structure connected to the bottom, not just the end region of the U-shaped structure. Similarly, the U2 region may also include the entire side of the U-shaped structure connected to the bottom.

In such way, the image forming apparatus 30 may access the first storage circuit 142 sequentially through the first interface circuit 121, the second interface circuit 151, the switching circuit 154, the third interface circuit 152, and the fourth interface circuit 141.

In another implementation manner, the first interface circuit 221 may be disposed on the side wall of the accommodation portion, and the second interface circuit 251 may be disposed on the outer side of the first interface circuit 221 (i.e., the side away from the accommodation portion).

Figure 10:
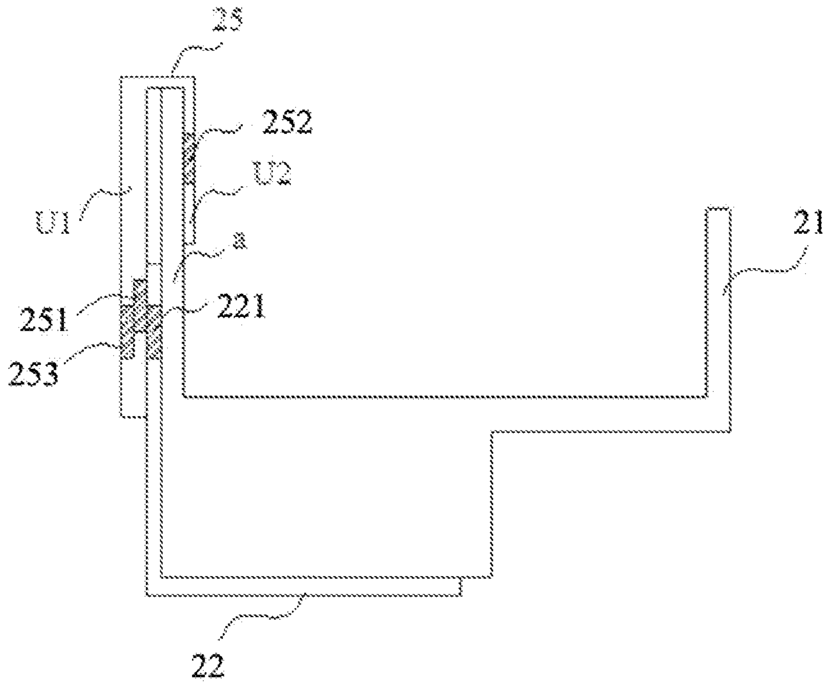
FIG. 10 illustrates a sixth structural schematic of a nozzle ink cartridge provided by exemplary embodiments of the present disclosure.

Specifically, referring to FIGS. 9-10, the ink container 23 may be installed on the ink cartridge main body 21, the first circuit substrate 22 may be disposed on the side wall a of the accommodation portion of the ink cartridge main body 21, and the first interface circuit 221 may be disposed on the side of the first circuit substrate 22 facing away from the side wall a. The second circuit substrate 25 may be disposed on the side of the first circuit substrate 22 away from the accommodation portion, that is, the second circuit substrate 25 may be located on the side of the first interface circuit 221 away from the accommodation portion. In addition, the second interface circuit 251 may be disposed on the side of the second circuit substrate 25 facing toward the first interface circuit 221, thereby being at least partially overlapped with the first interface circuit 221.

The electrical connection terminals of the fifth interface circuit 253 and the electrical connection terminals of the second interface circuit 251 may be respectively disposed on two opposite surfaces of the second circuit substrate 25; and one of the two surfaces may face toward the first interface circuit 221, and the other of the two surfaces may face away from the first interface circuit 221.

Similarly, in one exemplary embodiment, the second circuit substrate 15/25 may have a straight plate shape or a U-shaped structure. FIG. 1, FIG. 4, FIG. 6, and FIG. 9 may illustrate the case where the second circuit substrate 15/25 has the straight plate shape; and FIG. 8 and FIG. 10 may illustrate the case where the second circuit substrate 15/25 has the U-shaped structure. In one exemplary embodiment, according to the shape of the second circuit substrate 15, respective disposing positions of the third interface circuit 252 and the second interface circuit 251 may have different relative positional relationships.

For example, as shown in FIG. 6, when the second circuit substrate 25 has the straight plate shape, the third circuit interface 252 may be disposed on the side of the second circuit substrate 25 facing toward the side wall a (the first interface circuit 221 is disposed), and the fifth interface circuit 253 may be disposed on the side adjacent to the first interface circuit 221. At this point, the electrical connection terminals of the third interface circuit 252 and the electrical connection terminals of the fifth interface circuit 253 may be respectively disposed on a same surface of the second circuit substrate 25.

As shown in FIG. 10, when the second circuit substrate 25 has the U-shaped structure, the U-shaped structure may have the side portion U2, the third interface circuit 252 may be disposed on the side of the side portion U2 facing toward the outer side of the U-shaped structure, and the fifth interface circuit 253 may be disposed on the side of the side portion U1 facing toward the outer side of the U-shaped structure. The sides of the side portion U2 and the side portion U1 each facing toward the outer side of the U-shaped structure may be the outer surfaces of the U-shaped structure. In other words, in such case, respective electrical interfaces of the third interface circuit 252 and the fifth interface circuit 253 may be respectively disposed in different regions on different surfaces of the second circuit substrate 25.

Furthermore, the probe on the side of the image forming apparatus 30 is normally designed to be aligned with the first interface circuit 121/221, such that when the nozzle ink cartridge 10/20 is installed on the image forming apparatus 30, the probe of the image forming apparatus 30 may be connected to the first interface circuit 121/221. Therefore, the region where the second interface circuit 151/251 on the second circuit substrate 15/25 is located may cover the first interface circuit 121/221. In such way, when the nozzle ink cartridge 10 is installed on the image forming apparatus 30, the probe of the image forming apparatus 30 may be exactly connected to the second interface circuit 151/251.

One exemplary embodiment further provides a circuit substrate. The circuit substrate may be disposed with the second interface circuit 151/251, the third interface circuit 152/252, and the switching circuit 154/254 provided in one exemplary embodiment; and the switching circuit may be configured to be capable of processing signal transmission between the second interface circuit 151/251 and the third interface circuit 152/252.

One exemplary embodiment further provides a nozzle ink cartridge assembly, including the ink cartridge main body 11, the first circuit substrate 12 and the second circuit substrate 15 disposed on the ink cartridge main body 11, and the accommodation portion capable of accommodating the ink container that is replaceable, where the first circuit substrate 12 may be disposed with the nozzle circuit 122 and the first interface circuit 121 which are electrically connected to each other, and the second circuit substrate 15 may be disposed with the second interface circuit 151 and the third interface circuit 152; the second interface circuit 151 and the first interface circuit 121 may be disposed on the same side of the ink cartridge main body 11 and electrically connected to each other; meanwhile, the second circuit substrate may be also disposed with the switching circuit, and the switching circuit may be configured to be capable of processing signal transmission between the second interface circuit and the third interface circuit.

As disclosed, exemplary embodiments of the present disclosure provide the nozzle ink cartridge, the circuit substrate, and the nozzle ink cartridge assembly, where the nozzle ink cartridge may include the ink cartridge main body and the first circuit substrate disposed on the ink cartridge main body; the first circuit substrate may be configured with the nozzle circuit and the first interface circuit that are connected to each other; the nozzle ink cartridge may further include the second circuit substrate disposed on the ink cartridge main body, the accommodation portion, and the ink container that is replaceable; the second circuit substrate may be configured with the second interface circuit and the third interface circuit; the second interface circuit and the first interface circuit may be disposed on the same side of the ink cartridge main body and may be electrically connected to each other; the ink container may be contained in the accommodation portion; the ink container may be configured with the first storage circuit and the fourth interface circuit which are electrically connected to each other; the fourth interface circuit may be electrically connected to the third interface circuit; the first storage circuit may at least store the ink amount information of the ink container; the second circuit substrate may be further configured with the switching circuit; and the switching circuit may be configured to be capable of processing signal transmission between the second interface circuit and the third interface circuit. Through the above-mentioned design, the ink container of the nozzle ink cartridge may be replaced more conveniently; in addition, since the information between various chips of the ink cartridge can be transmitted smoothly, normal information exchange of the ink cartridge may be ensured, and after the ink container of the nozzle ink cartridge is replaced, the ink amount information read by the printer from the nozzle cartridge may indicate the ink amount of the ink container after replacement.

Furthermore, by configuring the ink container with the first storage circuit and the switching circuit, the switching circuit and the ink container with the first storage circuit may be mass-produced independently to improve the production efficiency. In addition, the switching circuit may be used repeatedly to save resources.

In the description of the present disclosure, it should also be noted that the terms "dispose", "install", "connect", and "connection" are to be understood broadly unless otherwise specifically stated and defined. For example, the connection may be a fixed connection, a detachable connection, or an integrated connection; the connection may be a mechanical connection or an electrical connection; and the connection may be a direct connection or indirect connection through an intermediate medium and may be an internal connection between the two elements. The specific meanings of the above-mentioned terms in the present disclosure may be understood in the specific circumstances for those skilled in the art.

It should be noted that in the present specification, relational terms such as first and second may merely be used to distinguish one entity or operation from another entity or operation, and may not necessarily require or imply any such actual relationship or order between these entities or operations.

The above may merely be specific implementation manners of the present disclosure, but the protection scope of the present disclosure may not be limited to these implementation manners. Those skilled in the art may easily think of changes or substitutions within the technical scope disclosed in the present disclosure, and such changes or substitutions should be covered by the protection scope of the present disclosure. Therefore, the protection scope of the present disclosure shall be subject to the protection scope of the claims.

What is claimed is:

1. A nozzle ink cartridge, including an ink cartridge main body and a first circuit substrate disposed on the ink cartridge main body, wherein the first circuit substrate is configured with a nozzle circuit and a first interface circuit that are electrically connected to each other, the nozzle ink cartridge being electrically connected or disconnected to an image forming apparatus through the first interface circuit; and the nozzle ink cartridge further comprising:

a second circuit substrate disposed on the ink cartridge main body, wherein the second circuit substrate is configured with a second interface circuit and a third interface circuit; and the second interface circuit and the first interface circuit are disposed on a same side of the ink cartridge main body and are electrically connected to each other; and an accommodation portion and an ink container that is replaceable, wherein the ink container is contained in the accommodation portion, the ink container is configured with a first storage circuit and a fourth interface circuit that are electrically connected to each other, the fourth interface circuit is electrically connected to the third interface circuit, and the first storage circuit at least stores ink amount information of the ink container; wherein:

the second circuit substrate is further configured with a switching circuit, and the switching circuit is configured to cause an electrical disconnection from the image forming apparatus through an electrical disconnection between the second interface circuit and the third interface circuit.

2. The nozzle ink cartridge according to claim 1, wherein:

a quantity of interfaces of the third interface circuit is less than a quantity of interfaces of the first interface circuit.

3. The nozzle ink cartridge according to claim 1, wherein:

a quantity of interfaces of the second interface circuit is equal to a quantity of interfaces of the third interface circuit.

4. The nozzle ink cartridge according to claim 1, wherein:

the switching circuit processes a signal transmitted from the second interface circuit, and transmits the signal to the third interface circuit.

5. The nozzle ink cartridge according to claim 1, wherein:

the third interface circuit includes a heating signal interface, wherein a signal transmitted by the heating signal interface is configured to heat liquid to jet the liquid out.

6. The nozzle ink cartridge according to claim 1, wherein:

the second circuit substrate further includes a fifth interface circuit; and the fifth interface circuit is electrically connected to the first interface circuit, and is electrically connected to the second interface circuit through the switching circuit.

7. The nozzle ink cartridge according to claim 6, wherein:

a quantity of interfaces of the fifth interface circuit is less than a quantity of interfaces of the first interface circuit.

8. The nozzle ink cartridge according to claim 6, wherein:

the fifth interface circuit includes a data interface.

9. The nozzle ink cartridge according to claim 1, wherein:

a quantity of interfaces of the second interface circuit is equal to a quantity of interfaces of the first interface circuit.

10. The nozzle ink cartridge according to claim 9, wherein:

the switching circuit processes a signal transmitted from the second interface circuit, and transmits the signal to the third interface circuit.

11. The nozzle ink cartridge according to claim 1, wherein:

the second circuit substrate further includes a second storage circuit;

and the switching circuit processes a signal transmitted from the second interface circuit, and transmits the signal to the second storage circuit.

12. The nozzle ink cartridge according to claim 11, wherein:

the second storage circuit include ink cartridge data.

13. The nozzle ink cartridge according to claim 1, wherein:

the switching circuit processes a signal transmitted from the second interface circuit into a signal identifiable by the first storage circuit.

14. The nozzle ink cartridge according to claim 13, wherein:

the switching circuit processes a received signal into a signal corresponding to an interface type of the fourth interface circuit.

15. The nozzle ink cartridge according to claim 1, wherein:

the switching circuit further includes a control circuit.

16. The nozzle ink cartridge according to claim 15, wherein: causes the electrical disconnection from when the ink amount information stored in the first storage circuit is preset data.

17. A circuit substrate, applied in an nozzle ink cartridge, wherein the nozzle ink cartridge includes a first circuit substrate, an accommodation portion, and an ink container that is replaceable;

the first circuit substrate is configured with a nozzle circuit and a first interface circuit which are electrically connected to each other, the nozzle ink cartridge being electrically connected or disconnected to an image forming apparatus through the first interface circuit; the ink container is contained in the accommodation portion;

the ink container is configured with a first storage circuit and a fourth interface circuit which are electrically connected to each other; the fourth interface circuit is electrically connected to a third interface circuit; and the first storage circuit at least stores ink amount information of the ink container;

wherein the circuit substrate is configured with a second interface circuit, the third interface circuit, and a switching circuit; the second interface circuit and the first interface circuit are electronically connected to each other; and the switching circuit is configured to cause an electrical disconnection from the image forming apparatus through an electrical disconnection between the second interface circuit and the third interface circuit.

18. A nozzle ink cartridge assembly, including an ink cartridge main body and a first circuit substrate disposed on the ink cartridge main body, wherein the first circuit substrate is configured with a nozzle circuit and a first interface circuit that are electrically connected to each other, the nozzle ink cartridge being electrically connected or disconnected to an image forming apparatus through the first interface circuit; and the nozzle ink cartridge assembly further comprising:

a second circuit substrate disposed on the ink cartridge main body, wherein the second circuit substrate is configured with a second interface circuit and a third interface circuit; and the second interface circuit and the first interface circuit are disposed on a same side of the ink cartridge main body and are electrically connected to each other;

an accommodation portion capable of accommodating an ink container that is replaceable, wherein:

the second circuit substrate is further configured with a switching circuit, and the switching circuit is configured to cause an electrical disconnection from the image forming apparatus through an electrical disconnection between the second interface circuit and the third interface circuit.

* * * * *